United States Patent [19]

Aigo

[11] Patent Number: 4,511,796
[45] Date of Patent: Apr. 16, 1985

[54] INFORMATION CARD

[76] Inventor: Seiichiro Aigo, 3-15-13, Negishi, Daito-ku, Tokyo, Japan

[21] Appl. No.: 448,239

[22] Filed: Dec. 9, 1982

[51] Int. Cl.³ .............................................. G06K 19/06
[52] U.S. Cl. ...................................... 235/492; 361/401
[58] Field of Search ...................... 235/382.5, 488, 492; 361/395, 401

[56] References Cited

U.S. PATENT DOCUMENTS

| | | | |
|---|---|---|---|
| 3,401,309 | 9/1968 | Shatz | 361/401 |
| 3,414,664 | 12/1968 | Kratochvil | 361/401 X |
| 4,004,133 | 1/1977 | Hannan et al. | 235/492 X |
| 4,417,413 | 11/1983 | Hoppe et al. | 235/488 X |

Primary Examiner—David L. Trafton
Attorney, Agent, or Firm—McGlew and Tuttle

[57] ABSTRACT

Disclosed herein is an information card consisted of a card member formed with a circular hole in a position thereof and an information unit disposed within said hole, said unit comprising semiconductor device or devices adapted to generate an output signal in response to an input signal or to provide like functions and a holding member for receiving said semiconductor device or devices, said holding member being provided with a circular outer periphery, the information card being characterized by that either the outer peripheral surface of the holding member or the inner peripheral surface of the hole of the card member has one or plurality of protrudent portions and the other is formed with a groove or grooves extending in a circular direction to receive the protrudent portion or portions, to thereby obviate disadvantages due to a seal treatment with cover sheets acted on the information card.

7 Claims, 16 Drawing Figures

INFORMATION CARD

FIELD OF THE INVENTION

This invention relates to an improvement in or relating to an information card which serves to generate an output signal in response to an input signal or to provide like function.

This kind of information card, for example as a discrimination card, is adapted to identify the card per se and to identify an individual or organization, and is available as a cash card, a credit card and so forth. Also, this information card is used for a process control and other various applications, due to storing an input signal or processing the input signal by a semiconductor device built in the card and due to storing the thus-processed information therein or generating an output signal in response to the input signal. An information unit forming the functional part of an information card is consisted of a microprocessor and a memory, or other type of semiconductor integrated circuit device, and can generate a complicated output signal to thereby prevent forgery of a card. This information card has many merits such as being produced in a mass production line, very small size, cheap production cost, accurate response, no influence of exterior disturbance, and so forth.

BACKGROUND OF THE INVENTION

In an accepted technique, an information unit of an information card is disposed within a hole or opening in a card member made of plastic or the like, and both surfaces of the card are sealed with a cover sheet in order to secure and hold the information unit in the hole so as to cover the same. In this seal treatment, the card accompanied with cover sheets are pressed between a pair of press members. Exact uniformity of the seal pressure is hardly accomplished, and thus an inequality causes a higher pressure on a part of an information unit and member. Such a seal pressure and a difference in expansion due to seal treatment may break the built semiconductor devices. Also, where an information unit is merely set in a hole of card member, the information unit may be easily taken off from the hole.

This invention aims at obviation of the above mentioned defects of the prior art. Therefore, the main object of the present invention is to provide an improved information card of which information unit can be secured in a position of card member without any seal treatment.

Another object of the invention is to facilitate assembly and disassembly of an information unit into or from a hole of card member.

The above and other objects, features and advantages of the present invention will become apparent from the following description and the appended claims, taken in conjunction with the accompanying drawings.

DETAILED DESCRIPTION OF THE INVENTION

Figure 1:
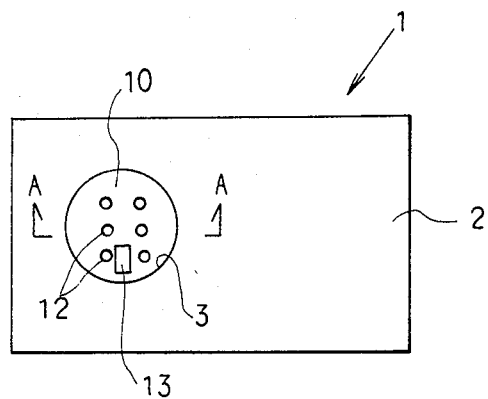
FIG. 1 is a plan view of an information card according to the present invention.
Figure 2:
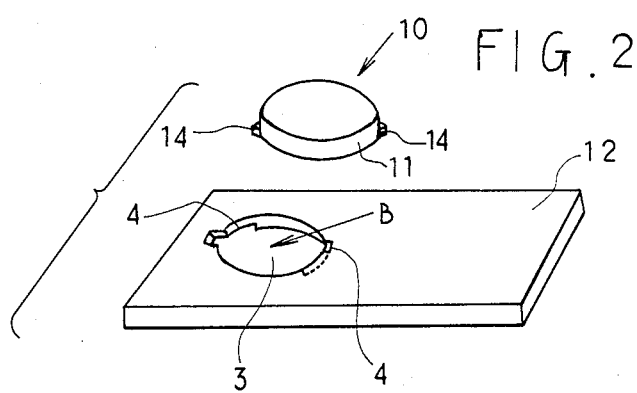
FIG. 2 is an exploded perspective view of the information card shown in FIG. 1.

Referring now to the accompanying drawings, certain preferred embodiments of the invention will be described. FIG. 1 illustrates the entirety of an information card to which the present invention relates. The information card 1 comprises an information unit 10 and a card member 2, card member 2 being preferably constituted by synthetic resin or the like. Information unit 10 comprises a holding member 11 having a circular outer periphery and with a semiconductor device or devices received therein. Numeral 12 denotes the signal input/output terminals which are brought into contact with semiconductor devices. Card member 2 is formed with a circular hole 3 for receiving an information unit 10. This hole 3 will be a blind hole or a through hole. Also, holding member 11 is constituted as a ring or a case, and can be made of synthetic resin. The member 11 is preferably constituted as a metal case of which at least the bottom portion is made of metal for electrically connecting the respective terminals 12 with the case. Such a metal case enables suction of heat generated in the semiconductor devices and obviation of electrostatic breakdown of the devices. Numeral 13 denotes a window covered with a glass used for ultraviolet-elimination of memory.

Figure 3:
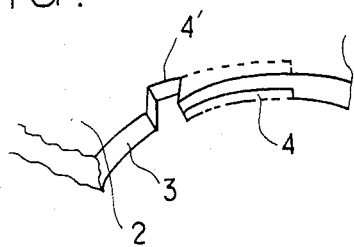
FIG. 3 is an enlarged fragmentary perspective view of a portion indicated by arrow B in FIG. 2.
Figure 4:
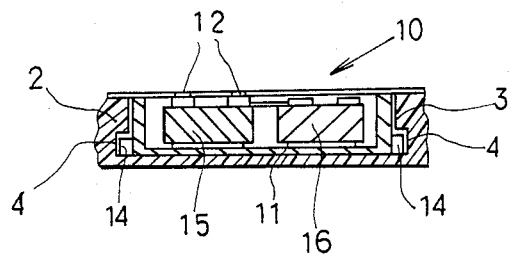
FIG. 4 is a cross-sectional view taken along line A—A in FIG. 1.

In an aspect of the invention, as seen in FIGS. 2–7, the outer peripheral surface of holding member 11 is provided with one or plurality of protrudent portions like projections 14, and the inner peripheral surface of hole 3 is formed with a groove or grooves 4 for receiving said projections 14. It is apparent that number of grooves 4 is equal to that of projections 14. As shown in FIG. 3, respective grooves 4 extend in a circular direction by a certain length. In this case, an end of groove 4 forms an inlet 4' which opens to a surface of card member 2. Projection 14 is adapted to be inserted through said inlet. Numerals 15 and 16 in FIG. 4 denote semiconductor devices which serve as a microprocessor and a memory or the like.

Figure 5:
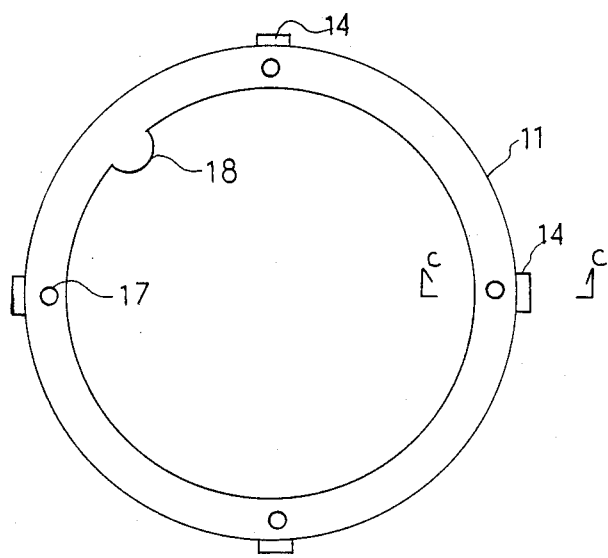
FIG. 5 is a plan view showing an example of a holding member used in an information card of the invention.
Figure 6:
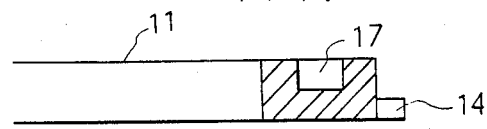
FIG. 6 is a cross-sectional view taken along line C—C in FIG. 5.
Figure 7:
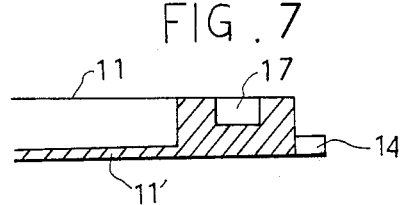
FIG. 7 is a cross-sectional view similar to FIG. 6, showing another embodiment.

Holding member 11 will be either a ring as shown in FIG. 5 and 6, or a case having a bottom plate 11' as shown in FIG. 7. Also, holding member 11 is desirably formed with some recesses 17 at its surface. This facilitates an angular displacement of the member 11 by means of pin or like means to be inserted into the recesses. Numeral 18 in FIG. 5 denotes a guide portion for setting semiconductor devices and some members relevant thereto in a predetermined position.

Figure 11:
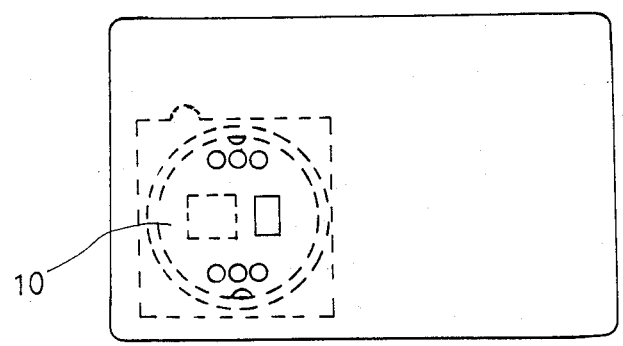
FIG. 11 is a plan view of another embodiment of an information card of the invention.
Figure 8:
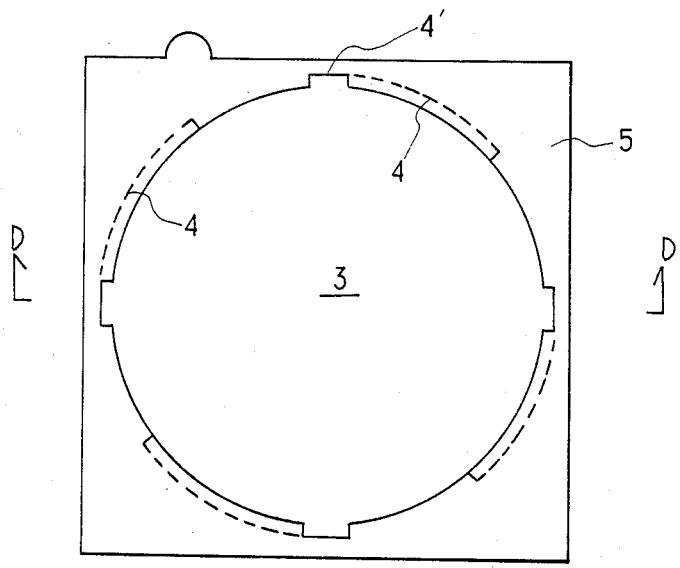
FIG. 8 is a plan view of a member defining a hole for receiving an information unit.
Figure 9:
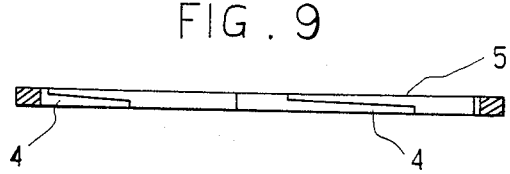
FIG. 9 is a cross-sectional view taken along line D—D in FIG. 8.

The hole 3 may be formed in card member 2 per se, but said hole is preferably formed in a metal member 5 to be embedded in the card member 2, as shown in FIG. 8. Use of the member 5 facilitates formation of grooves 4 in the inner peripheral surface of hole 3. FIG. 11 shows an information card 1 comprising such a member 5 in which holding member 11 is disposed. As shown in FIG. 9, groove 4 is preferably slightly slant with respect to a circular direction.

Also, before an information unit 10 is set in hole 3 of information member 2, a sheet of plastic or the like will be applied or sealed on the surface of information unit. Since this seal treatment on an information unit is performed on a small area, it can be effected with a limited pressure and a high temperature is not required therefor. Therefore, this treatment does not lead to a breakdown of semiconductor devices set within the unit.

Figure 10:
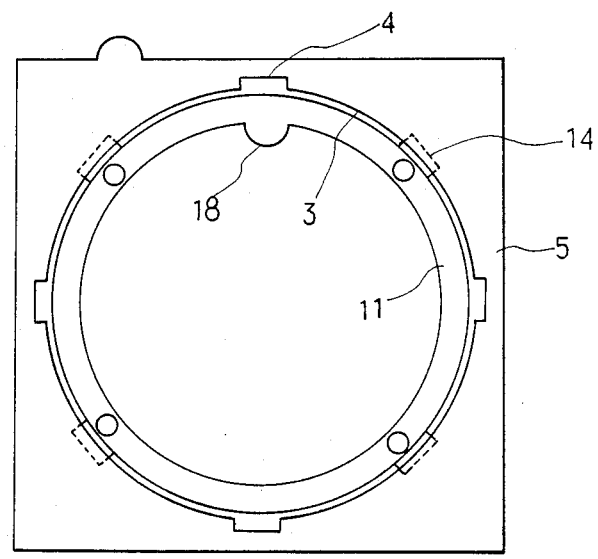
FIG. 10 is a plan view showing a member defining a hole and an information unit engaged in the hole.

In order to set an information unit 10 into hole 3 of card member 2, respective projections 14 of holding member 11 should be inserted into corresponding inlets 4' formed at one end of grooves 4 and then holding member 11 is angularly displaced or rotated (in an example shown in FIG. 8, ⅛ revolution) to thereby bring projections 14 to the other end of grooves 4, as shown in FIG. 10. Then, where grooves 4 are slightly slant, holding member 11 is tightened. In this condition, information unit 10 is fixed held within hole 3 by projections 14 engaged with grooves 4.

Figure 12:
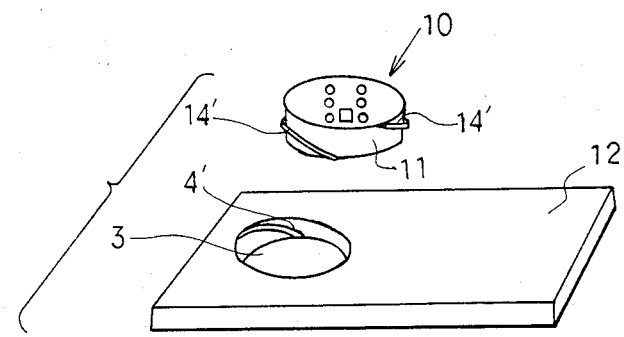
FIG. 12 is an exploded perspective view of still other embodiment of the information card.
Figure 13:
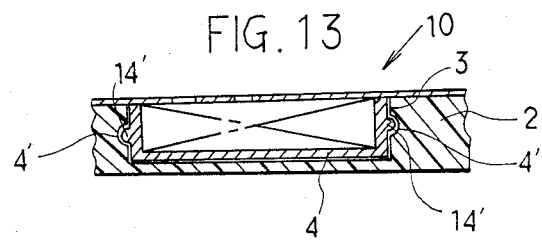
FIG. 13 is a cross-sectional view of main portion of the information card shown in FIG. 12. And, FIG. 14 (A),(B),(C) are respectively a cross-sectional view showing structures of prior art information cards.

While projections 14 are formed on holding member 11 in the above described embodiments, said projections may be formed in the inner peripheral surface of hole 3 and grooves 4 may be formed in the outer peripheral surface of holding member 11. Also, plurality of projections 14 as shown are preferably provided, whereas one protrudent portion 14 may be available. Further, as shown in FIGS. 12 and 13, each protrudent portion is preferably a screw thread 14' and thus each groove 4 is of a screw shape mating therewith. In this case, preferably, screw threads 14' are formed in the outer peripheral surface of holding member 11 and screw shaped grooves 4' in the inner peripheral surface of hole 3 of card member 2, whereas the contrary may be employed. In some cases, the outer peripheral surface of holding member 11 is formed with a male screw and the inner peripheral surface of hole 3 is formed with a female screw.

Figure 14A:
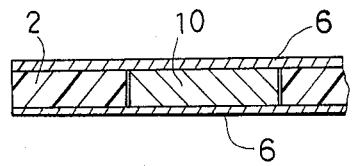
Figure 14B:
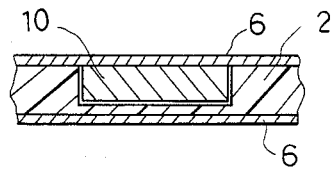
Figure 14C:

As mentioned above, since information unit 10 is fixedly held in a position of card member 2 by engagement of protrudent portions 14 with grooves 4, surfaces of the card 1 will not be covered with sheets in a seal treatment. That is, both surfaces of a prior art information card as shown in FIG. 14(a) and (b) should be sealed with sheets 6 in order to secure an information unit embedded in card member, while according to the present invention, such seal treatment will not be needed. Otherwise, as shown in FIG. 14 (c), another prior art information card in which an information unit is merely put in a hole of card member is accomplished with a defect that said unit may easily be left out, whereas the information card of the invention does not bring with such a defect.

Therefore, it will be possible to fixedly hold an information unit in a position of card member without a seal treatment when the present invention is applied to an information card. Accordingly, semiconductor devices included in an information card will not be affected be a seal pressure and a temperature in a seal treatment. And, this invention facilitates assembly as well as disassembly of an information unit in a card. Furthermore, an information unit engaged in a hole of card member is not left out, even if any exterior forces are applied on the card.

Having now exemplified the invention, it will be apparent to one of ordinary skilled in the art that many changes and modifications can be made thereto without departing from the spirit or scope of the invention as set forth herein.

I claim:

1. An information card comprising a card member having a hole defined therein including an information unit receiving portion of the hole in at least one inlet portion of the hole extending radially outwardly of the information unit receiving portion at at least one circumferential location, and an information unit including a holder having a semiconductor device being positionable in the receiving portion of the hole including at least one radially extending projection which is passable only through the inlet portion, said card member having at least one groove extending circumferentially through an arc angle of less than 90°, said projection being alignable with the groove to permit limited rotation of said holder within the hole of said card member as the projection moves around the groove.

2. An information card according to claim 1, wherein there are a plurality of projections at spaced circumferential locations around said information unit corresponding in number with correspondingly spaced inlet portions and grooves.

3. An information card according to claim 1, wherein said information unit holder comprises a cylinder and wherein said card member has a cylindrical hole defining said information unit receiving portion with a radially extending projection at diametrically opposite locations defining said inlet portion.

4. An information card according to claim 1, wherein said holder comprises a metal case.

5. An information unit according to claim 1, wherein the groove extends slightly eccentrically.

6. An information card according to claim 1, wherein said card member has a metallic member formed with the hole thereof.

7. An information card according to claim 1, wherein said information unit holder has a surface with a handling recess thereon offset from the axis thereof to facilitate rotational movement thereof.

* * * * *